United States Patent
Medina Perilla et al.

(10) Patent No.: US 11,173,471 B2
(45) Date of Patent: Nov. 16, 2021

(54) OXYGEN-ABSORBENT COMPOSITION COMPRISING A SILICA MATRIX THAT ENCAPSULATES FATTY ACIDS, UNSATURATED ESTERS OR COMPOUNDS CONTAINING SAME, AND METHOD FOR PRODUCING SAID COMPOSITION

(71) Applicant: UNIVERSIDAD DE LOS ANDES, Bogota (CO)

(72) Inventors: Jorge Alberto Medina Perilla, Bogota (CO); Angela Maria Garcia Mora, Bogota (CO); Jacques Verdu, Paris (FR); Jairo Arturo Escobar Gutierrez, Bogota (CO); Bruno Fayolle, Paris (FR)

(73) Assignee: UNIVERSIDAD DE LOS ANDES, Bogota (CO)

( * ) Notice: Subject to any disclaimer, the term of this patent is extended or adjusted under 35 U.S.C. 154(b) by 201 days.

(21) Appl. No.: 16/463,840

(22) PCT Filed: Nov. 24, 2017

(86) PCT No.: PCT/IB2017/057392
§ 371 (c)(1),
(2) Date: May 23, 2019

(87) PCT Pub. No.: WO2018/096499
PCT Pub. Date: May 31, 2018

(65) Prior Publication Data
US 2019/0291076 A1 Sep. 26, 2019

(30) Foreign Application Priority Data
Nov. 24, 2016 (CO) .................. NC2016/0004488

(51) Int. Cl.
*B01J 20/26* (2006.01)
*C09K 15/06* (2006.01)
(Continued)

(52) U.S. Cl.
CPC .......... *B01J 20/261* (2013.01); *A23L 3/3436* (2013.01); *B01J 20/103* (2013.01); *B01J 20/22* (2013.01);
(Continued)

(58) Field of Classification Search
None
See application file for complete search history.

(56) References Cited

U.S. PATENT DOCUMENTS

| 4,908,151 A | 3/1990 | Inoue |
| 5,538,840 A | 7/1996 | Van Toan et al. |

(Continued)

FOREIGN PATENT DOCUMENTS

| CN | 103951948 A | 7/2014 |
| JP | H08193001 A | 7/1996 |

(Continued)

OTHER PUBLICATIONS

Garcia Mora et al.,"Kinetic modeling of oxygen absorption by unsaturated esters and linseed oil to be used as oxygen scavengers", Universidad de los Andes, 2016, pp. 1-158.
(Continued)

*Primary Examiner* — Joseph D Anthony
(74) *Attorney, Agent, or Firm* — Lucas & Mercanti, LLP

(57) ABSTRACT

The production of an oxygen-absorbent composition is provided, having: (a) a porous silica encapsulation matrix; and (b) a composition containing an oxygen-absorbent compound selected from fatty acids, unsaturated esters or compounds containing same, and, optionally, a catalyst based on an inorganic salt of a transition metal, wherein the compo-
(Continued)

sition (b) is encapsulated in the porous silica matrix (a). The composition can form part of the structure of the packaging for oxidation sensitive products or be placed in the surrounding atmosphere to reduce the concentration of oxygen. A method for encapsulating the active compound or the active compound together with a catalyst, and subsequently incorporating same into polymer matrices is also provided.

7 Claims, 5 Drawing Sheets

(51) Int. Cl.
| | |
|---|---|
| *B01J 20/10* | (2006.01) |
| *B01J 20/24* | (2006.01) |
| *A23L 3/3436* | (2006.01) |
| *B01J 20/28* | (2006.01) |
| *B01J 20/30* | (2006.01) |
| *B01J 27/053* | (2006.01) |
| *B65D 81/26* | (2006.01) |
| *B01J 20/22* | (2006.01) |

(52) U.S. Cl.
CPC ......... *B01J 20/24* (2013.01); *B01J 20/28004* (2013.01); *B01J 20/28026* (2013.01); *B01J 20/3021* (2013.01); *B01J 20/3071* (2013.01); *B01J 20/3085* (2013.01); *B01J 27/053* (2013.01); *B65D 81/266* (2013.01); *C09K 15/06* (2013.01); *A23V 2002/00* (2013.01)

(56) References Cited

U.S. PATENT DOCUMENTS

| | | | |
|---|---|---|---|
| 5,977,212 | A | 11/1999 | Ebner et al. |
| 6,039,892 | A | 3/2000 | Himeshima et al. |
| 6,248,258 | B1 | 6/2001 | Tomita et al. |
| 7,255,852 | B2* | 8/2007 | Gallis .................. A61K 8/25 423/335 |
| 2002/0153512 | A1 | 10/2002 | Himeshima et al. |
| 2006/0069197 | A1 | 3/2006 | Tammaji et al. |
| 2007/0184300 | A1 | 8/2007 | Yokose et al. |
| 2008/0138549 | A1 | 6/2008 | Kitahara et al. |
| 2008/0258105 | A1 | 10/2008 | Kitahara et al. |
| 2009/0061249 | A1 | 3/2009 | Kitahara et al. |
| 2011/0259778 | A1 | 10/2011 | Share et al. |
| 2013/0207042 | A1* | 8/2013 | Joven Pineda ........ B01J 20/223 252/400.3 |
| 2016/0002483 | A1* | 1/2016 | Zhao .................... C09D 5/14 426/102 |

FOREIGN PATENT DOCUMENTS

| | | |
|---|---|---|
| WO | 9853026 A1 | 11/1998 |
| WO | 2012020287 A1 | 2/2012 |

OTHER PUBLICATIONS

International Search Report for Corresponding International Application No. PCT/IB2017/057392 (3 Pages) (dated Mar. 19, 2018).

* cited by examiner

OXYGEN-ABSORBENT COMPOSITION COMPRISING A SILICA MATRIX THAT ENCAPSULATES FATTY ACIDS, UNSATURATED ESTERS OR COMPOUNDS CONTAINING SAME, AND METHOD FOR PRODUCING SAID COMPOSITION

CROSS REFERENCE TO RELATED APPLICATION

This Application is a 371 of PCT/IB2017/057392 filed on Nov. 24, 2017, which claims priority of Colombian Application No. NC2016/0004488 filed Nov. 24, 2016, both of which are incorporated herein by reference.

1. FIELD OF THE INVENTION

The present invention relates to an oxygen-absorbent composition and to the method of production thereof. The oxygen-absorbent composition comprises an encapsulating matrix that encapsulates a composition comprising fatty acids, unsaturated esters or compounds containing them and optionally an inorganic salt of a transition metal. The encapsulating matrix is prepared by the sol-gel method. This oxygen-absorbent composition can be used in the manufacture of packaging with oxygen sequestering capacity.

2. BACKGROUND OF THE INVENTION

Several compounds are known in the prior art for inhibiting the degradation caused by oxidation reactions in packed substances, by means of compositions that react chemically or physically with the oxygen present in the headspace of the packaging, or that is present in the environment and that permeates through the material forming the walls of the packaging (Anthierens et al., 2011; Charles, Sanchez, & Gontard, 2006; Galotto, Anfossi, & Guarda, 2009). Substances of this type are usually called oxygen scavengers or absorbents.

Various compounds have been proposed as oxygen scavengers or absorbents, of both organic and inorganic character, which in some cases need to be accompanied by a catalyst that initiates the absorption reaction (Anthierens et al., 2011; Charles, Sanchez, & Gontard, 2006; Galotto, Anfossi, & Guarda, 2009).

The compounds of inorganic character include iron-based substances, such as salts and powder of the metal. Said substances are mentioned in patents U.S. Pat. Nos. 5,143, 763 and 5,928,560. These compounds are used conventionally by putting them in small air-permeable sachets inside packaging for dry products, preventing direct contact between the compounds and the packed product. This presentation has the risk of contamination of the product through possible breakage of the sachets or even through possible ingestion of the sachet.

Organic substances that fulfill the function of oxygen absorbents, such as ascorbic acid, ascorbates, isoascorbates, ascorbyl palmitate, salicylic acid and derivatives of these substances, need to be in contact with a salt forming complexes that initiate the oxygen absorption reaction, wherein said salt is generally derived from a transition metal. Details and examples of these absorbent substances can be seen in U.S. Pat. Nos. 4,524,015, 6,465,065, 6,274, 210 and 1186656383.

There are patents that have claimed organic oxygen scavenger compositions, whether or not accompanied by catalysts, incorporated in polymer matrices such as US patent application U.S. Pat. No. 5,364,555 and Japanese applications 61-238,836 and 54-022,281. However, for these organic compounds there are two conditions that have to be taken into account: firstly, by reacting with the oxygen directly or indirectly and owing to their organic nature they give rise to reaction products that may affect the structure of the packaging and/or that may migrate to the packed product, causing its quality to deteriorate; and secondly, to ensure and improve their efficiency they must be protected from the effects of temperature or UV radiation.

For example, oxidation of ascorbic acid and derivatives thereof activated by temperature and ultraviolet radiation has been widely studied and gives rise to the presence of substances that promote unpleasant odors and colors, such as furfural, which has a pungent odor and causes browning in foods (Commission of the European Communities, 2001) (Giorgia Spigno, 1999) (Jeane Santos de Rosa, 2007) (Kurata & Sakurai, 1967) (Pascault, Sautereau, Verdu, & Williams, 2002) (Santos, 2008).

An oxygen scavenger composition that contains a chelate of salicylic acid or a complex thereof with a transition metal or a salt of the metal, which can be incorporated in a polymer matrix such as PVC, is claimed in U.S. Pat. No. 5,364,555. However, it does not specify the method by which effective incorporation of the oxygen scavenger in the matrix is achieved, and does not teach or suggest how to prevent migration of the reaction products between salicylic acid and oxygen to the packed product. In fact, the formulation disclosed therein relates to the manufacture of liners that adhere to the crown closures or seals of the products instead of to containers that contain the oxygen scavenger in the whole of their structure.

Japanese patent application 61-238,836 discloses a film for packaging structures made of a thermoplastic material such as low-density polyethylene (LDPE), which includes ascorbic acid alone or in combination with aliphatic polycarboxylic acids. Although it is mentioned that the film disclosed therein has good barrier properties to gases, it does not specify the method by which ascorbic acid can be protected against premature degradation in the manufacture of the film or the way in which migration of the oxidation products of the acid to the packaging structure or to the food can be prevented.

Similarly, Japanese patent application 54-022,281 discloses a tray for fruit made of thermoplastic foam and a thin layer of ascorbic acid or erythorbic acid (or any alkaline salts thereof), deposited on the slots of the tray on which the fruit will be put. However, there are still doubts about the oxidation products of these compounds and how to prevent them coming into contact with the packed fruit.

In view of the technical problems identified, namely the possible degradation of the organic oxygen-absorbent compounds during processing and the possible migration of their reaction products, there is a need for oxygen-absorbent compositions that do not have these undesirable effects.

U.S. Pat. No. 5,977,212 claims a composition in which the scavengers are contained in an inert, porous matrix, which could hold the reaction products and moreover protect it from thermal effects during processing with the polymer matrix. However, said patent does not disclose the method for carrying it out, and it does not specify the effect that this matrix has on the kinetics of oxygen absorption. The same applies to U.S. Pat. No. 6,458,438, in which a polymer film is claimed that contains the oxygen scavenger in a zeolite matrix.

Patent US20130207042 relates to an oxygen-absorbent composition for protecting packed products that are sensitive to oxidation, which comprises an oxygen-absorbent compound, which may be erythorbic acid or a salt of erythorbic acid, a catalyst based on a transition metal salt, encapsulated in a matrix of silica gel of molecular formula $SiO_2xH_2O$. This document also relates to a sol-gel method of preparing the encapsulating matrix that includes the steps of preparing a powdered mixture of the oxygen-absorbent substance and the catalyst, adding said mixture to an aqueous solution to form an aqueous suspension, neutralizing the aqueous solution, allowing the gel to settle, washing it with water to remove salts, and finally drying the washed gel.

Patent US20130207042 only considers the use of erythorbic acid or a salt of erythorbic acid and a catalyst based on a transition metal salt as an oxygen-absorbent composition, but does not consider the use of unsaturated fatty acids, unsaturated esters or linseed oil as oxygen absorbents, which, owing to their composition with a high content of double bonds promote autoxidation, activated not only by moisture, as in the case of erythorbic acid and the like, but also by temperature and UV radiation, which extends the range of use of the absorbent to products that are not wet or that are affected adversely by adding moisture for activating the absorbent.

In the method in patent US20130207042 there is no explanation of the effect of the particle size of the encapsulated oxygen absorbent on the efficiency of oxygen capture, and it only presents examples with polyethylene matrices, without exploring other materials used in the packaging industry such as polypropylene and PET.

In addition, the sol-gel technique has been used in applications such as encapsulation of biological active material and substances such as lipids, membranes, proteins, enzymes, dyes and carotenoids in porous materials such as silica or zeolites. This type of encapsulating is disclosed in patents U.S. Pat. Nos. 5,200,334, 6,767,483, 6,495,352 and in the documents:

- M. Mureseanu, A New Mesoporous Micelle-Templated Silica Route for Enzyme Encapsulation, 34296 Montpellier Cedex 5, France, 2005.
- J. W. Gilliland, Solvent Effect on Mobility and Photostability of Organic Dyes Embedded inside Silica Sol Gel Thin Films, University of Oklahoma, Norman, Oklahoma 73019, 2005.
- Z. He, Carotenoids in Sol Gels: Incorporation, Stability, and Sensitivity to Oxidant and Acid, Tuscaloosa, Alabama 35487-0336, 2000.
- M. Saenz, Investigation of the Reaction Variables in Synthesis of Silica Gel absorbent, Revista de Ingeneria e Investigación, Vol. 27 No. 2, August 2007.

However, although the prior art has looked for solutions to the technical problem considered in the present application, which is to provide new oxygen-absorbent compositions capable of preventing the possible degradation of organic oxygen-absorbent compounds during processing and the possible migration of their reaction products, oxygen-absorbent compositions do not even exist in which the absorbent compound can be activated by methods different from moisture or is selected from fatty acids, unsaturated esters or compounds containing them, wherein said absorbent compound is encapsulated in a silica matrix by the sol-gel method, which make it possible to hold the oxidation reaction products and moreover protect the oxygen-absorbent compound against premature degradation in packaging of products that are sensitive to oxidation.

In particular, it is pertinent to mention that none of the cited prior art reports the oxygen absorption capacity that is displayed by the absorbent composition disclosed herein, as will be shown hereunder in the examples.

3. GENERAL DESCRIPTION OF THE INVENTION

According to the problems that have been identified in the prior art, the present application provides an oxygen-absorbent composition and a method of manufacture thereof, which can be exposed to the working temperatures of the polymers used for the packaging structures without being degraded prematurely, which inhibits the migration of undesirable compounds within said packaging structure and/or to the packed product and that maintains kinetics of oxygen absorption within the packaging suitable for long-term storage of products that are sensitive to oxidation, and which moreover can be activated by temperature or UV radiation.

The composition may be used in packaging structures that protect products susceptible to oxidation such as juices, cheeses, meat products, coffee, and pharmaceutical products among other so-called perishables, as well as products with low moisture content or that are sensitive to moisture.

This innovative composition may be used in the following forms:
a) dispersed and distributed in a polymer layer of the packaging structure;
b) distributed and dispersed in a label or polymer patch inside the container or inside the lid of the latter;
c) contained in a porous sachet that is placed in double-bottom containers or in a cell located inside the lids of the packaging container, by indirect contact with the product being packed.

In particular, the present application provides an oxygen-absorbent composition that comprises:
a) a composition comprising: an oxygen-absorbent compound and optionally a catalyst based on an inorganic salt of a transition metal; and
b) a porous silica matrix, where the aforesaid composition is encapsulated. This matrix is prepared by sol-gel reaction.

The porous matrix and the method of encapsulation claimed in this patent application have been demonstrated to provide effective protection against the thermal oxidation that the absorbent compounds undergo at temperatures above 60° C., increasing their processability at least to 300° C.

Therefore the present invention illustrates a novel formulation by which an oxygen-absorbent compound, in particular unsaturated fatty esters, and optionally a catalyst derived from a salt of a transition metal, are encapsulated in a porous silica matrix. The advantages offered by the present invention relative to the prior art include an increase in oxygen consumption capacity and activation by temperature and UV radiation.

4. BRIEF DESCRIPTION OF THE FIGURES

FIG. 1 shows the method for encapsulating the oxygen-absorbent compound and the catalyst based on an inorganic salt of a transition metal.

FIG. 2 shows the results of measurement of the molar percentage of oxygen (mole fraction of oxygen) as a function of time for the absorbent compound prepared. It shows the capacity for oxygen capture in a container with 38 ml of headspace that contains 1 gram of linseed oil encapsulated in silica gel and the capacity for oxygen capture in a container with 38 ml of headspace that contains 1 g of linseed oil and ferrous sulfate encapsulated in silica gel, activated by moisture of 99% relative humidity for 1 hour without grinding.

FIG. 3 shows the results of measurement of the molar percentage of oxygen (mole fraction of oxygen) as a function of time for the absorbent active compound prepared. It shows the capacity for oxygen capture in a 38 ml flask that contains 1 gram of linseed oil and ferrous sulfate encapsulated in silica gel, activated by moisture (99% relative humidity) for 1 hour, dried and ground to a particle size between 25 and 45 micrometers.

FIG. 4 shows the results for oxygen capture of the films made from linseed oil-ferrous sulfate encapsulated in silica gel with polypropylene. It shows the results for: an encapsulated linseed oil composition, ground for 180 minutes until a particle size less than 25 micrometers is reached; an encapsulated linseed oil composition with a catalyst; an encapsulated linseed oil composition; and an encapsulated linseed oil composition ground for 90 minutes until a particle size less than 25 micrometers is reached.

FIG. 5 compares the efficiency of oxygen absorption capacity of two films obtained by different methods.

5. DETAILED DESCRIPTION OF THE INVENTION

Figure 1:
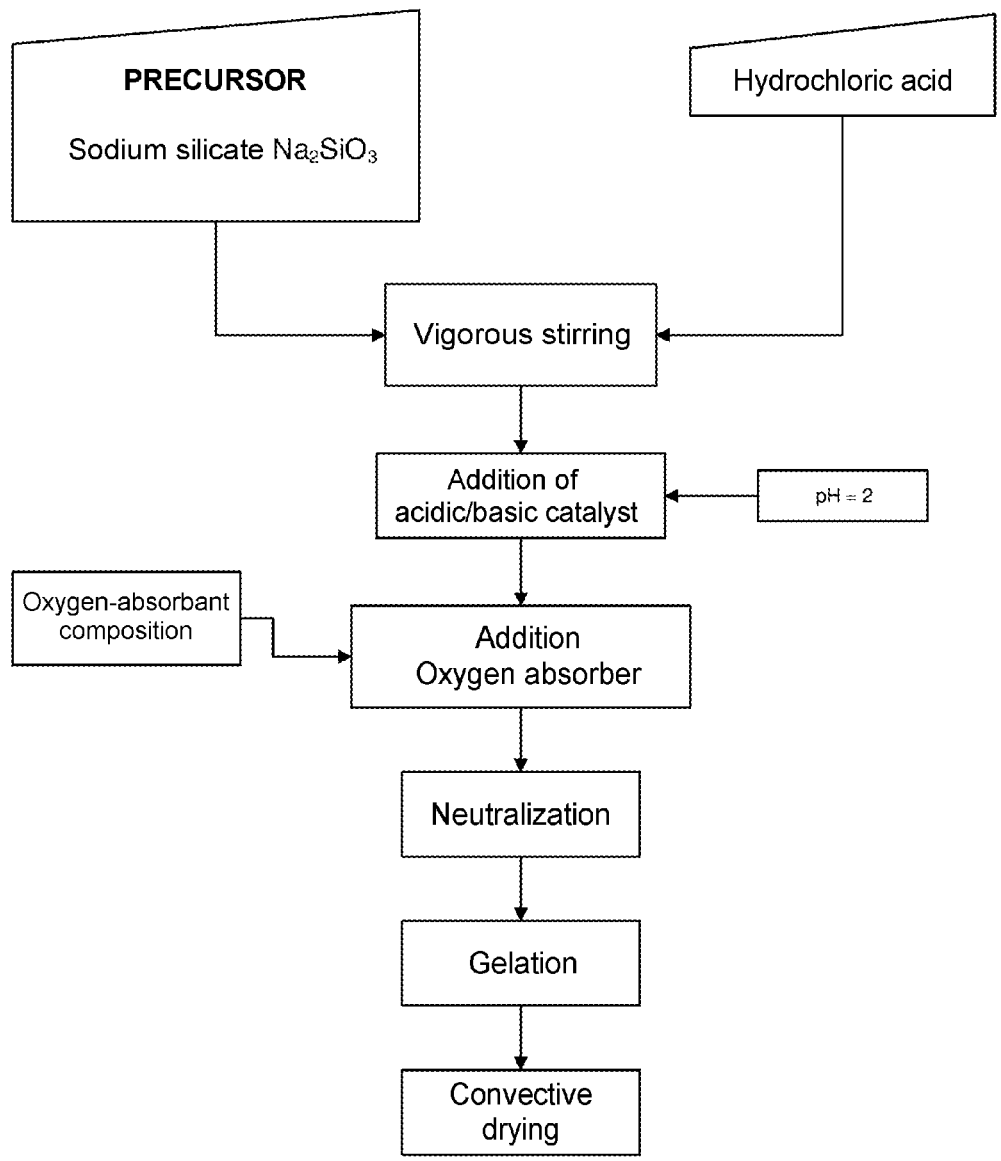

The present invention relates to an oxygen-absorbent composition that comprises: a porous silica matrix prepared by sol-gel reaction that encapsulates an active composition comprising an oxygen-absorbent compound and optionally a catalyst based on an inorganic salt of a transition metal.

4.1. Description of the Oxygen-Absorbent Compound

The oxygen-absorbent compound may be an unsaturated fatty acid, an unsaturated ester, a phospholipid or a compound containing them. In particular, the oxygen-absorbent compound is selected from the group consisting of (but not limited to) linseed oil, methyl oleate, methyl linoleate, methyl linolenate and/or soybean lecithin.

4.2. Description of the Catalyst Based on an Inorganic Salt of a Transition Metal An inorganic salt of a transition metal, which acts as a catalyst of the absorption reaction, may optionally be used in combination with the oxygen-absorbent compound. Said catalyst is an inorganic salt of a transition metal, which may be a copper (I) chloride, a ferrous sulfate, a ferrous fumarate or a combination thereof. For suitable catalytic action, the inorganic salt of a transition metal is present in a ratio between 39% and 200% w/w with respect to the oxygen-absorbent substance.

4.3. Description of the Porous Silica Matrix

The oxygen-absorbent substance, individually or in combination with the catalyst based on an inorganic salt of a transition metal, is encapsulated in a porous silica matrix. Encapsulation in this matrix offers the following advantages: the possibility of incorporating the oxygen-absorbent compound in a polymer layer that forms part of a packaging structure or in a polymer patch that adheres to the interior thereof, the possibility of being incorporated inside a cell or porous sachet to prevent direct contact with the product being packed, protection of the components of the oxygen-absorbent compound against premature thermal degradation during manufacture of the packaging structure, to control the kinetics of the action of the absorbent compound and retain the products generated during oxidation of the absorbent.

4.4. Description of the Method for Encapsulating the Oxygen-Absorbent Compound Individually or in Combination with the Catalyst Based on a Inorganic Salt of a Transition Metal in a Silica Matrix The method for encapsulating the oxygen-absorbent compound individually or in combination with the catalyst based on an inorganic salt of a transition metal includes the steps given in detail hereunder:

(a) At a temperature between 283.15K and 323.15K, preferably between 283.15K and 298.15K, in the case of an absorbent compound in powder form, mixing it with the catalyst based on an inorganic salt of a transition metal in a ratio between 0.01 and 5 grams, preferably 0.39 grams and 2 grams per gram of absorbent compound, and forming an aqueous suspension of the mixture, with a concentration between 67 kg/m$^3$ and 133 kg/m$^3$. When the catalyst is not included, the suspension is prepared with the oxygen absorbent alone.

(b) At a temperature between 283.15K and 323.15K, preferably between 283.15K and 298.15K, adding, while stirring continuously and monitoring the pH, to a solution of an organic acid such as citric acid or inorganic such as hydrochloric acid with a concentration between 1M and 5M, preferably 1.55M and 3.00M, and with a pH less than 1, an amount of silicate precursor, for example such as sodium silicate or tetraethyl orthosilicate in the range between 22 kg and 56 kg per cubic meter of hydrochloric acid solution and whose concentration is between 40 kg/m$^3$ and 560 kg/m$^3$, by stirring at a maximum of 100 Hz (6000 rpm), until a maximum pH of 2 is reached.

(c) Adding the suspension prepared in step (a) or the individual oxygen-absorbent compound, depending on the case, continuing to add the silicate precursor in a ratio from 10 to 40 kilograms of solution of silicate precursor per m$^3$ of hydrochloric acid solution, until a gel is obtained, at pH between 6 and 9.

(d) The gel obtained is left to rest for a time between 1 hour and 48 hours, at a temperature between 283.15K and 323.15K.

(e) After the resting time, the gel is washed several times (preferably once or twice) with water, to remove the salts that result from the neutralization reaction, using vacuum between 600 and 6000 Pa, preferably between 600 and 2000 Pa.

(f) After washing, drying the gel at temperatures between 333.15° K. and 363.15° K., at atmospheric pressure or under vacuum.

An example of the method for encapsulating the oxygen-absorbent compound individually or in combination with the catalyst based on an inorganic salt of a transition metal is shown in FIG. 1.

4.5. Description of the Method for Incorporating the Oxygen-Absorbent Composition in a Polymer Matrix The method for incorporating the oxygen-absorbent composition obtained by the aforesaid method in a polymer matrix includes the following steps:
(a) Subjecting the oxygen-absorbent composition to operations of size reduction and homogenization, in a ball mill for 30 to 210 min, and selecting the particles of the absorbent compound with a size less than 45 micrometers;
(b) Incorporating the oxygen-absorbent composition, with a size less than 45 micrometers, in the polymer matrix in a proportion from 1 to 10 wt %, relative to the polymer; a compatibilizer may be included to prevent agglomeration of the oxygen-absorbent composition, in a proportion up to 5%, relative to the polymer, by means of a mixer with variable angular velocity that may operate at between 0 and 1.67 Hz (0 and 100 rpm), with a melt viscosity in the range $10^3$-$10^6$ Pa-s.

Size reduction of the oxygen-absorbent composition is carried out by means of a grinding system. In addition, uniformity of size is achieved by sieving operations using mesh sizes less than or equal to 180 micrometers.

6. EXAMPLES

The following examples illustrate the present invention. However, it must be understood that these are not limiting, according to the knowledge of a person of average skill in the art.

Example 1

Specifications of Silicate Precursor: Sodium Silicate

A sodium silicate with the specifications illustrated in Table 1 is used for producing the oxygen-absorbent composition.

TABLE 1

| Sodium silicate specifications | |
|---|---|
| Parameter | Value |
| Density, degrees Bé at 293.15° K (20° C.) | 50 ± 1 |
| Specific gravity | 1.48 to 1.5 |
| Alkalinity (% $Na_2O$) | 12.5 ± 1 |
| Silica (% $SiO_2$) | 31.20 to 33.15 |
| Ratio ($Na_2O:SiO_2$) | 1:2.10 to 1:2.40 |
| Viscosity | 600 to 850 centipoise |
| pH | 12 ± 0.5 |

Example 2

Illustration of the Method of Encapsulation of the Oxygen-Absorbent Active Compound in the Silica Matrix—FIG. 1

The steps carried out for encapsulation of an absorbent compound (double boiled linseed oil), individually, in the silica matrix, are presented below.

1. Dissolve 38.05 g of concentrated hydrochloric acid (37% w/w) to a volume of 250 ml
2. Dissolve 170 g of sodium silicate (specifications in Table 1) to a volume of 1000 ml
3. Put all the dilute acid in a beaker on a stirring plate with monitoring of pH
4. Put the sodium silicate solution in a washing funnel
5. Start neutralization of the acid by adding silicate until a pH of 2 is reached
6. Add 76 g of double boiled linseed oil
7. Continue adding silicate until a gel is obtained
8. Leave the gel to age for 24 h
9. Dry the gel in a stove at 60° C. and atmospheric pressure, until a weight change of less than 10% is obtained
10. Grind the composition in a ball mill with a ratio between 10:1 (weight of balls:sample to be ground) and 20:1 by weight
11. Sieve, selecting the sample with size less than 25 μm.

Example 3

Figure 2:
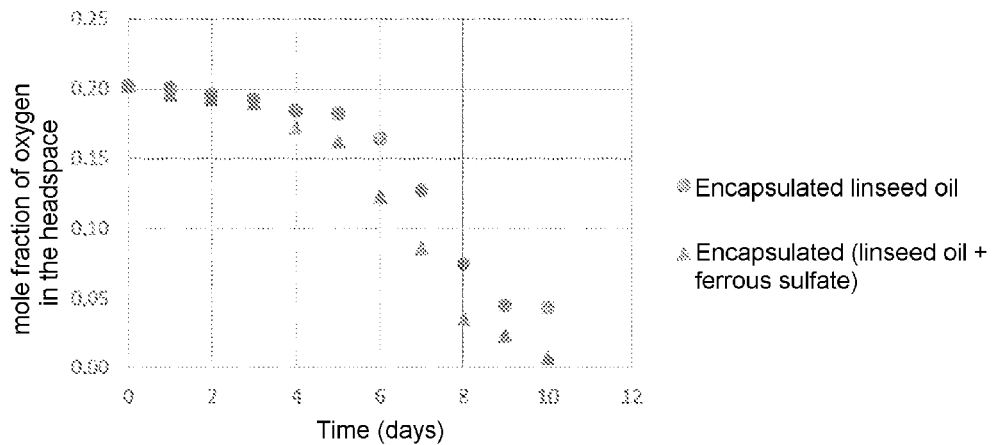

Illustration of the Absorption Capacity of the Oxygen-Absorbent Active Compound with Addition of Metal Catalyst—FIG. 2

The effect of adding catalyst is compared for the active ingredient double boiled linseed oil. The first sample consists of linseed oil without addition of catalyst encapsulated in silica gel by the method described in example 2; the second sample consists of a mixture of linseed oil and ferrous sulfate as metal catalyst (weight ratio of catalyst 0.5% of the weight of linseed oil), encapsulated in silica gel. 1 gram of each sample is put in different vessels, each with a volume of 38 ml, they are put in a chamber with relative humidity of 99%, at 25° C. for one hour, and then the concentration of oxygen was monitored for 10 days in ambient conditions. For this example the catalyst shows a slight acceleration in the rate of oxygen capture.

Example 4

Figure 3:
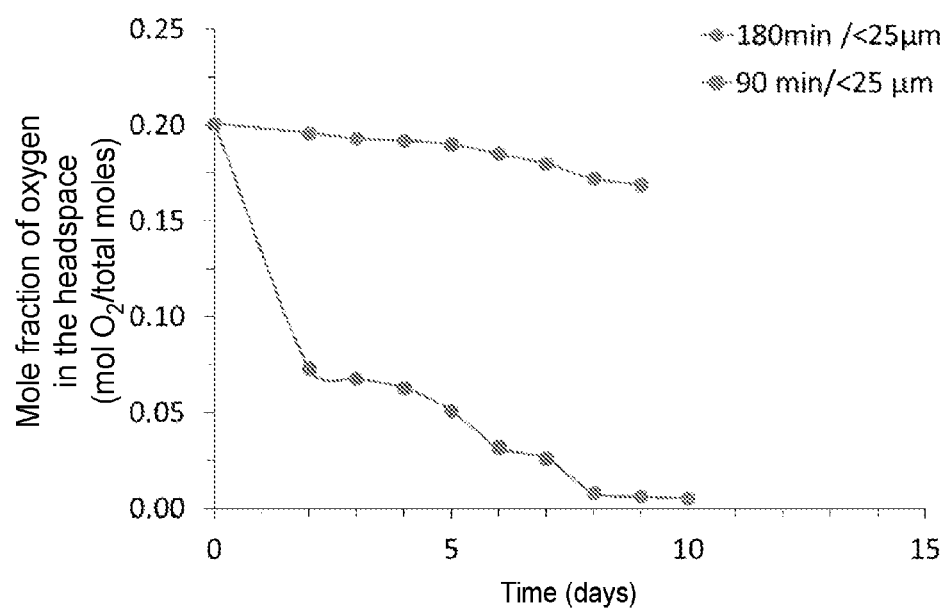

Illustration of the Absorption Capacity of the Oxygen-Absorbent Composition—Effect of Grinding—FIG. 3

A mixture of linseed oil and ferrous sulfate in a weight ratio of 100:0.5 was encapsulated in silica gel, dried, and ground for 90 minutes; another sample with the same characteristics of composition is ground for 180 minutes. Each sample is sieved and the particles with size less than 25 micrometers are selected. 1 gram of each sample was put in different vessels, each with a volume of 38 ml, they are put in a chamber with a relative humidity of 99%, at 25° C. for one hour and then the concentration of oxygen was monitored for 10 days in ambient conditions. The sample that was ground for a longer time showed a considerable loss of capacity for oxygen capture, and the influence of the processing variables on the performance of the oxygen-absorbent composition was noted.

Example 5

Figure 4:
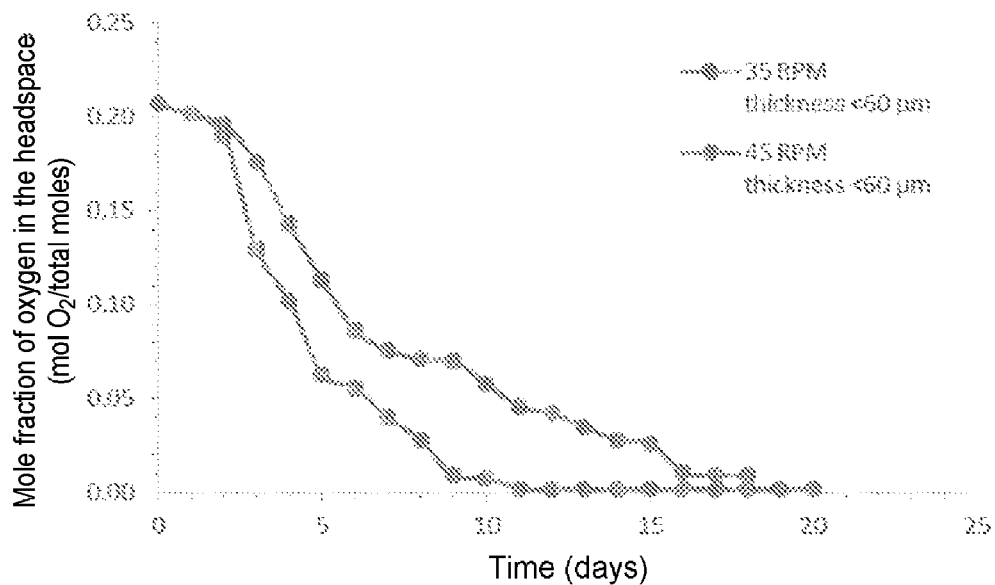

Illustration of the Absorption Capacity of the Oxygen-Absorbent Composition in a Polymer Such as Polypropylene—FIG. 4

The mixture of linseed oil and ferrous sulfate encapsulated in a ratio (100:0.5 correspondingly) was mixed with polypropylene in a twin-screw extruder at a constant temperature of 190° C. in all the extrusion zones and then activated by moisture. FIG. 4 shows the effect on the oxygen capture of the activated film as a function of the rotary speed. The film that is obtained at a higher speed reduces the oxygen concentration more slowly than that processed at 35 rpm, but both have the same average performance.

Example 6

Figure 5:
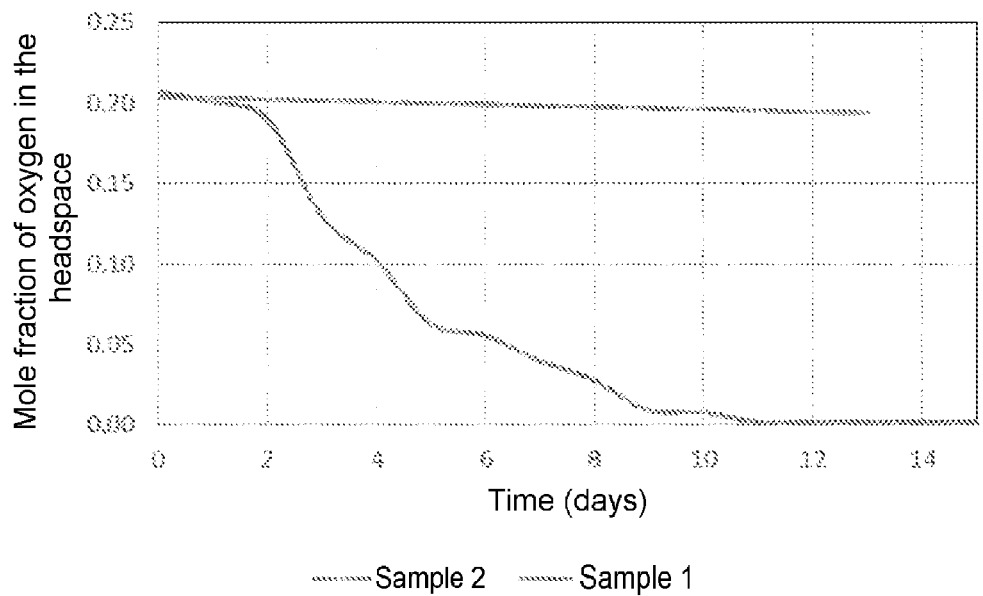

Technical Advantages of the Method Used in the Present Application—FIG. 5

The efficiency of oxygen absorption capacity of two films obtained by different methods is compared in FIG. 5.

Sample 1 is formed from polypropylene (PP) and encapsulated soybean lecithin and in a ratio 90% PP and 10% of encapsulated lecithin by weight.

Sample 2 is formed from polypropylene and an encapsulated mixture of linseed oil and ferrous sulfate in a ratio 90% of PP and 10% of encapsulated mixture. Moreover, for sample 2, the following operations described in this patent were carried out:
1. Grinding, sieving and selection of particles encapsulated in silica gel.
2. Control of extrusion speed, extrusion equipment and temperature profile.

Example 7

Oxidation Capacity of Methyl Linolenate

Figure 6:
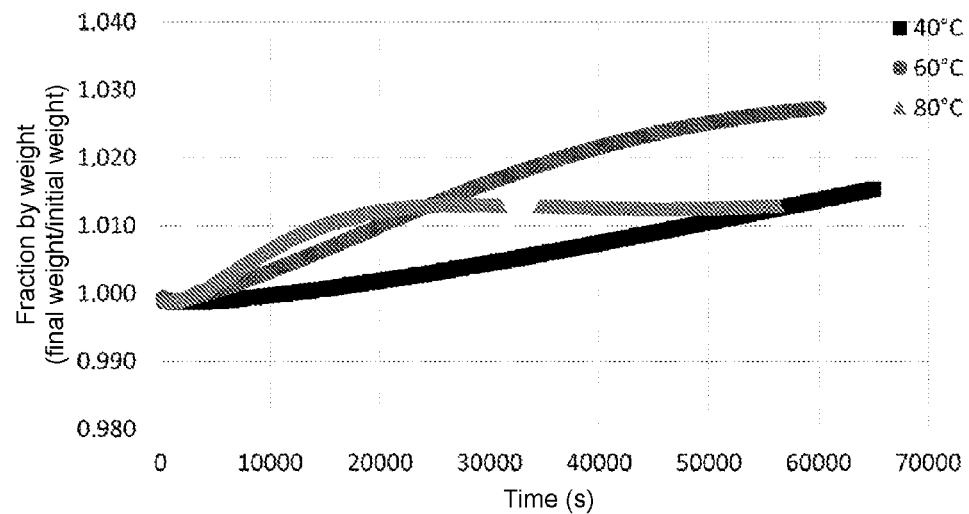
FIG. 6 shows the results for oxidation in an air atmosphere in a study of the oxidation capacity of methyl linolenate.
Figure 7:
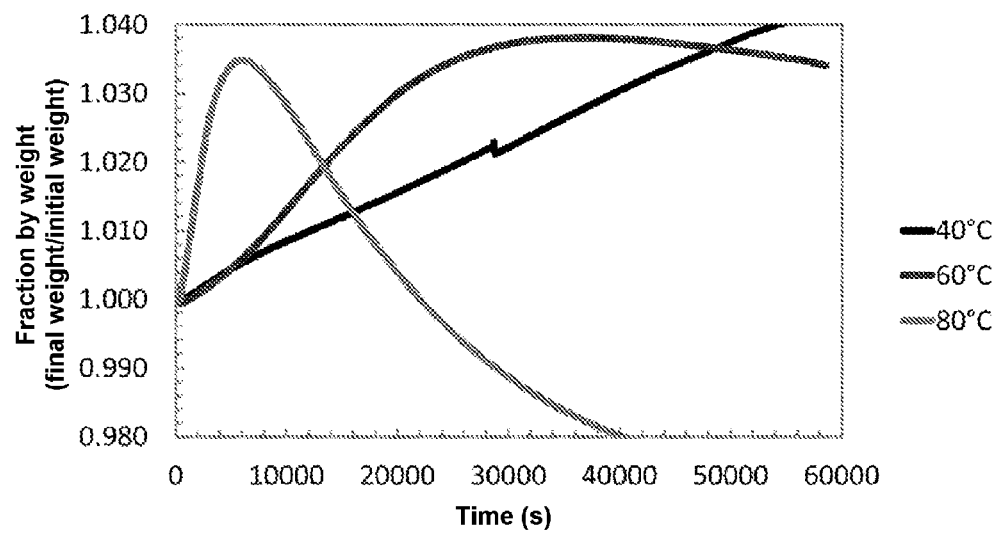
FIG. 7 shows results in an atmosphere with 99% oxygen content in a study of the oxidation capacity of methyl linolenate.

The oxidation capacity of methyl linolenate in an air atmosphere and an oxygen atmosphere was investigated by thermogravimetry. FIG. 6 shows the results for oxidation in an air atmosphere and FIG. 7 shows the results in an atmosphere with 99% oxygen content. The unsaturated ester achieves an increase of 3.5 wt %, attributable to oxygen consumed during thermal oxidation at 80° C.

Example 8

Effect of Copper Chloride Catalyst and Encapsulation in Soybean Lecithin

Figure 8:
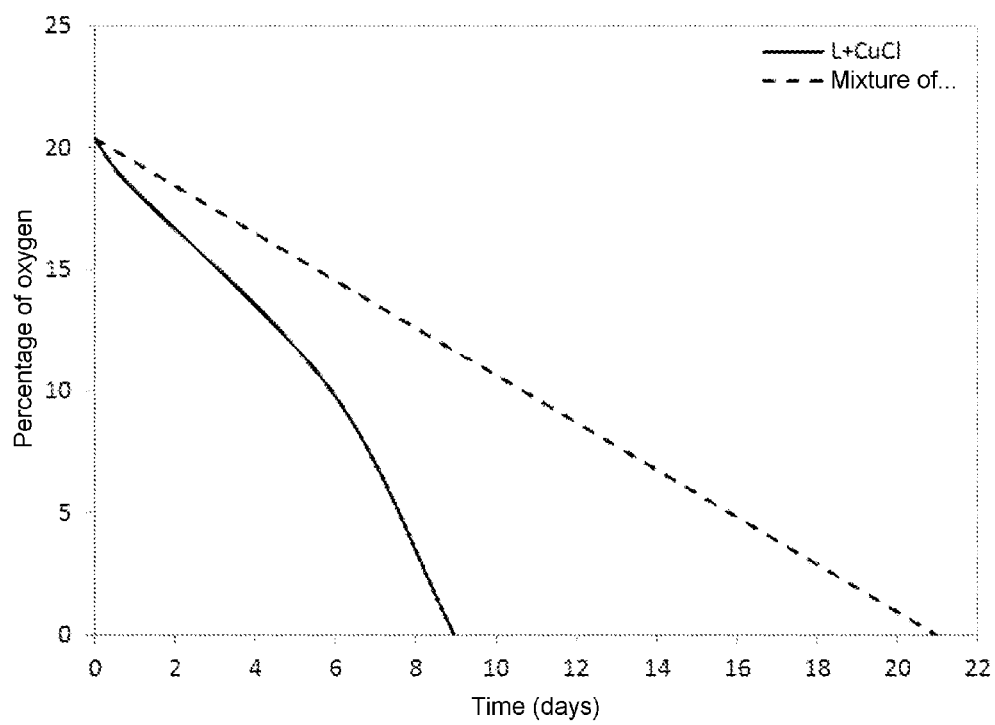
FIG. 8 shows the effect of sol-gel encapsulation on the absorption capacity of a mixture of soybean lecithin+copper chloride.

FIG. 8 shows the effect of sol-gel encapsulation on the absorption capacity of a soybean lecithin+copper chloride mixture.

The invention claimed is:

1. An oxygen-absorbent composition that protects packed products that are susceptible to oxidation comprising:
    (i) an encapsulating porous silica matrix;
    (ii) a composition that contains an oxygen-absorbent compound selected from the group consisting of linseed oil, methyl oleate, methyl linoleate and soybean lecithin,
    wherein the composition (ii) is encapsulated in the porous silica matrix (i), wherein the oxygen-absorbent composition is obtained by
    (a) forming an aqueous suspension comprising the oxygen-absorbent compound having a concentration of 67-133 kg/m$^3$;
    (b) while stirring continuously, adding an amount of silicate precursor to a solution of acid with an acid concentration between 1M and 5M until a maximum pH of 2 is reached, wherein the amount of silicate precursor is 22-56 kg per cubic meter of the solution of acid;
    (c) adding the aqueous suspension obtained in step (a) to the solution obtained in step (b);
    (d) adding additional silicate precursor to the solution obtained in step (c), obtaining a gel with a pH between 6 and 9, wherein the silicate precursor is added in a ratio of 10-40 kg of solution of silicate precursor per cubic meter of the solution of acid;
    (e) leaving the gel obtained in step (d) to stand for 1 to 48 hours;
    (f) washing the gel with water, removing the salts that result from the neutralization reaction;
    (g) drying the gel obtained; and
    (h) submitting the dried gel obtained in step (g) to operations of size reduction and homogenization for 30-180 minutes to obtain particles with a size less than 45 micrometers.

2. The oxygen-absorbent composition according to claim 1, wherein the porous silica matrix is a hydrated silica gel of molecular formula $SiO_2xH_2O$.

3. The oxygen-absorbent composition according to claim 1, wherein the absorbent composition is incorporated in a polymer matrix, further comprising the following step after step (h):
    (b) incorporating the particles of the oxygen-absorbent composition, with the size less than 45 micrometers, in a polymer matrix in a proportion from 1 to 10 wt %, relative to the polymer, using a mixer with variable angular velocity.

4. The oxygen-absorbent composition according to claim 1, wherein the composition comprises a catalyst based on an inorganic salt of a transition metal.

5. The oxygen-absorbent composition according to claim 4, wherein the inorganic salt of the transition metal is selected from the group consisting of copper(I) chloride, ferrous sulfate, ferrous fumarate and a combination thereof.

6. The oxygen-absorbent composition according to claim 4, wherein the inorganic salt of the transition metal is in a ratio between 0.01 and 5 grams per gram of the oxygen-absorbent substance.

7. The oxygen-absorbent composition according to claim 6, wherein the inorganic salt of a transition metal is in a ratio between 0.39 grams and 2 grams per gram of the oxygen-absorbent substance.

* * * * *